United States Patent [19]

Aoki et al.

[11] Patent Number: 5,052,769
[45] Date of Patent: Oct. 1, 1991

[54] METHOD OF MANUFACTURING AN OPTICAL WAVEGUIDE BY SWITCHING A D.C. VOLTAGE

[75] Inventors: Hiroshi Aoki, Kanagawa; Osamu Maruyama, Tokyo, both of Japan

[73] Assignee: Hoya Corporation, Tokyo, Japan

[21] Appl. No.: 502,849

[22] Filed: Mar. 30, 1990

[30] Foreign Application Priority Data

Mar. 31, 1989 [JP] Japan .................................. 1-82282

[51] Int. Cl.$^5$ .............................................. G02B 6/10
[52] U.S. Cl. .................................................... 385/130
[58] Field of Search ............... 350/96.12; 204/192.26, 204/192.27, 192.28, 192.29, DIG. 30, DIG. 35, DIG. 38

[56] References Cited

U.S. PATENT DOCUMENTS 4,691,983 9/1987 Kobayashi et al. ............... 350/96.12
4,932,743 6/1990 Isobe et al. ...................... 350/96.12 X Primary Examiner—William L. Sikes
Assistant Examiner—Phan T. Heartney
Attorney, Agent, or Firm—Ladas & Parry

[57] ABSTRACT

In a method of manufacturing an optical waveguide which comprises a substrate having a first refractive index and a light-transmitting passage which is buried into the substrate and which is formed by an ionizable substance having a second refractive index greater than the first refractive index, the ionizable substance is diffused into the substrate from an overlying layer through a diffusion-suppressing layer by impressing a positive polarity of a d.c. voltage and forms a diffused region. Thereafter, the ionizable substance is partially released from the diffused region towards the overlying layer by impressing a negative polarity of the d.c. voltage. A configuration of the diffused region is thus controlled during impression of the negative polarity of the d.c. voltage and formed into the light-transmitting passage.

4 Claims, 5 Drawing Sheets

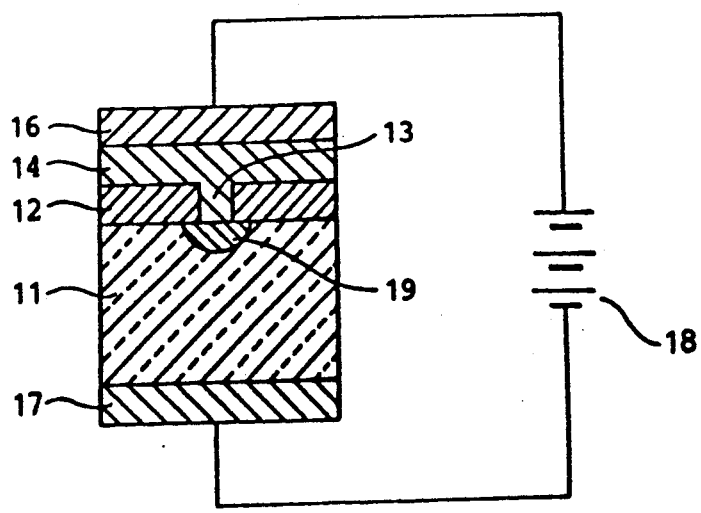
FIG. 1 (A) PRIOR ART
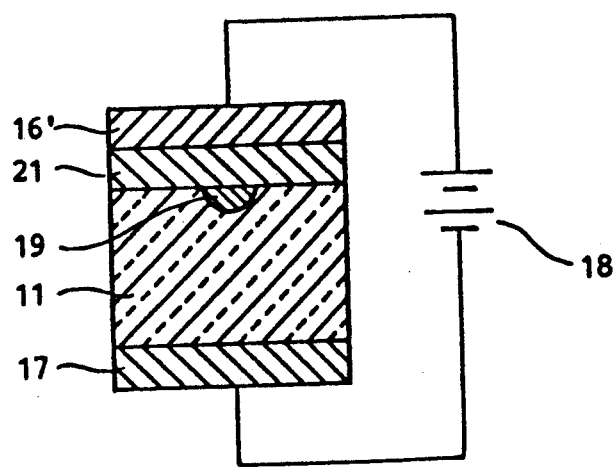
FIG. 1 (B) PRIOR ART

METHOD OF MANUFACTURING AN OPTICAL WAVEGUIDE BY SWITCHING A D.C. VOLTAGE

BACKGROUND OF THE INVENTION

This invention relates to a method of manufacturing an optical waveguide which is for use in guiding an optical ray and applicable, for example, to an optical switch, an optical coupler, and the like.

As a rule, an optical waveguide of a type described is used for guiding a light wave in an optical device so as to carry out telecommunication with the other devices. The optical waveguide comprises a transparent substrate and a light-transmitting or optical passage buried in the transparent substrate. In this event, the transparent substrate is formed by a material containing a primary ionizable substance, such as sodium (Na), which provides a predetermined refractive index, but the light-transmitting passage is formed by a material containing a secondary ionizable substance, such as silver (Ag), which provides a refractive index greater than the predetermined refractive index.

With this structure, the optical waveguide can guide the light wave through the light-transmitting passage because the light-transmitting passage has a refractive index greater than that of the transparent substrate.

Heretofore, a method is disclosed in Japanese Unexamined Patent Publication No. Syô 48-61157, namely, 61157/1973. In this method, the light-transmitting passage is buried in the transparent substrate by immersing the transparent substrate in an electrolytic solution including silver ions (Ag+) and in another electrolytic solution including sodium ions (Na+). This method may be called a wet method and is effective to completely bury the light-transmitting passage in the transparent substrate. Inasmuch as the light-transmitting passage is completely buried in the transparent substrate, the light-transmitting passage is not exposed to the atmosphere.

However, the wet method is disadvantageous in that the transparent substrate is undesirably eroded by the electrolytic solution during the immersion of the transparent substrate. In addition, it is difficult in the wet method to control the amount of ions which is diffused into the transparent substrate.

Alternatively, another conventional method is described in an article in the Journal of Applied Physics (page 93, 28a-A-2 fall, 1982). This conventional method may be referred to as a dry method and will be described in detail with reference to one figure of the accompanying drawing. At any rate, the light-transmitting passage is formed without using any electrolytic solution Instead, the light-transmitting passage is buried into the transparent substrate by impressing a d.c. voltage in an atmosphere. More particularly, the transparent substrate of, for example, glass is prepared which has primary and secondary surfaces and which contains a primary ionizable substance, for example, Na providing a predetermined refractive index. Thereafter, a diffusion-suppressing layer of, for example, titanium (Ti) is covered on the transparent substrate and is partially removed by the use of a photolithographic technique, to selectively expose the primary surface, and to thereby define an exposed area of the primary surface. The diffusion-suppressing layer may be also called a diffusion-prevention layer. Subsequently, an overlying layer is deposited by the use of sputtering or vacuum evaporation on the exposed area and on the diffusion-suppressing layer. The overlying layer contains a secondary ionizable substance of, for example, Ag providing a refractive index greater than the predetermined refractive index.

Finally, the d.c. voltage is impressed between the overlying layer and the secondary surface of the transparent substrate to ionize the secondary ionizable substance, to diffuse or immigrate secondary ions into the transparent substrate, and to thereby form the light-transmitting passage. Such impression of the d.c. voltage is carried out after electrodes are deposited on the overlying layer and the secondary surface by the use of sputtering or vacuum evaporation.

Next, after the diffusion of the secondary ions, the diffusion-suppressing layer is removed from the transparent substrate together with the overlying layer. Thereafter, an additional layer of a primary ionizable substance, such as chloride, fluoride, or metal is deposited on said primary surface of the transparent substrate by sputtering or vacuum evaporation.

Finally, the d.c. voltage is again impressed between the additional layer and the secondary surface of the transparent substrate to ionize the primary ionizable substance into primary ions. Consequently, the primary ions are diffused or immigrated into the transparent substrate, to thereby form a buried light-transmitting passage.

However, the dry method is disadvantageous in that a difference of stoichiometric compositions is inevitably present between a target and a deposited layer, such as the overlying layer.

SUMMARY OF THE INVENTION

It is an object of this invention to provide a method of manufacturing an optical waveguide which has an excellent distribution of a refractive index.

It is another object of this invention to provide a method of manufacturing a light-transmitting passage which has an elliptic or a circular configuration in section and which is buried in a transparent substrate by a dry method.

It is still another object of this invention to provide an optical waveguide manufactured by the above-mentioned method.

A method to which this invention is applicable is for use in manufacturing an optical waveguide which guides a light wave through a light-transmitting passage. The method comprises a first step of preparing a substrate which has a primary surface and a secondary surface and which contains a primary ionizable substance providing a predetermined refractive index, a second step of depositing a diffusion-suppressing layer on the primary surface of the substrate, a third step of forming a slit by selectively removing the diffusion-suppressing layer, for example, by the use of a photolithographic technique in order to partially expose the primary surface and to thereby define an exposed area of the primary surface, and a fourth step of depositing an overlying layer on the exposed area and on the diffusion-suppressing layer. The overlying layer contains a secondary ionizable substance which provides a refractive index greater than the predetermined refractive index. The method further comprises a fifth step of forming the optical waveguide by supplying a d.c. voltage from a d.c. voltage source on both sides of the overlying layer and the secondary surface. According to this invention, the fifth step comprises the steps of preparing a switch circuit to switch the d.c. voltage between a positive polarity and a negative polarity, impressing a selected polarity of the positive and the negative polarities of the d.c. voltage between the overlying layer and the secondary surface through the switch circuit to ionize the secondary ionizable substance and diffuse the secondary ions into the substrate through the slit in order to form a diffused region of the secondary ions, switching the switching circuit to change the d.c. voltage from the selected polarity of the d.c. voltage to the other polarity of the positive and the negative polarities of the d.c. voltage and to impress the voltage of the other polarity between the overlying layer and the secondary surface, and partially releasing the secondary ions from the diffused region towards the overlying layer to shape the light-transmitting passage.

BRIEF DESCRIPTION OF THE DRAWING

FIGS. 1(A) and (B) show in a conventional dry method with a part sectioned;

DESCRIPTION OF THE PREFERRED EMBODIMENTS

Figure 2:
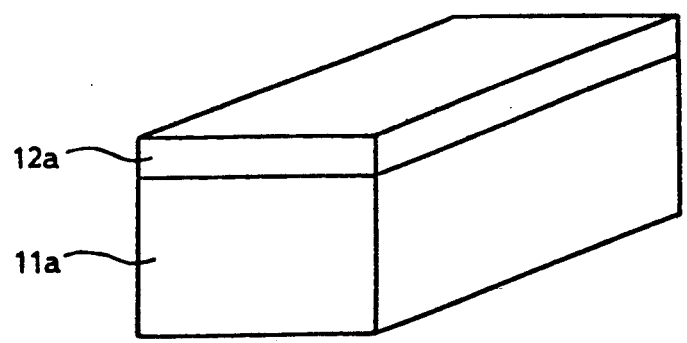
FIGS. 2(A), (B), (C), and (D) show a method according to a preferred embodiment of this invention.
Figure 2:
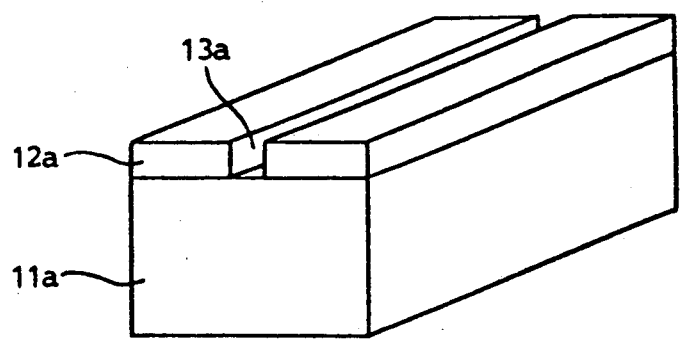
Figure 2:
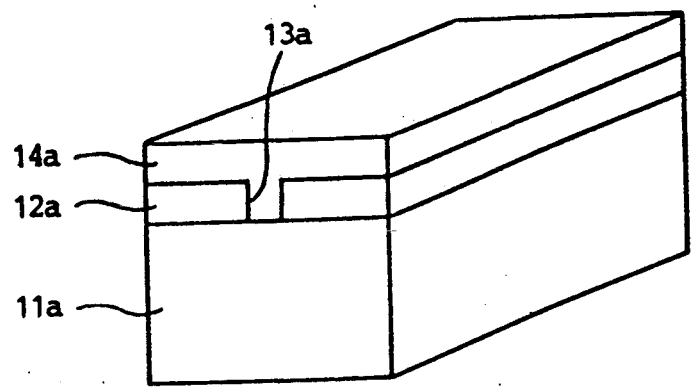
Figure 2:
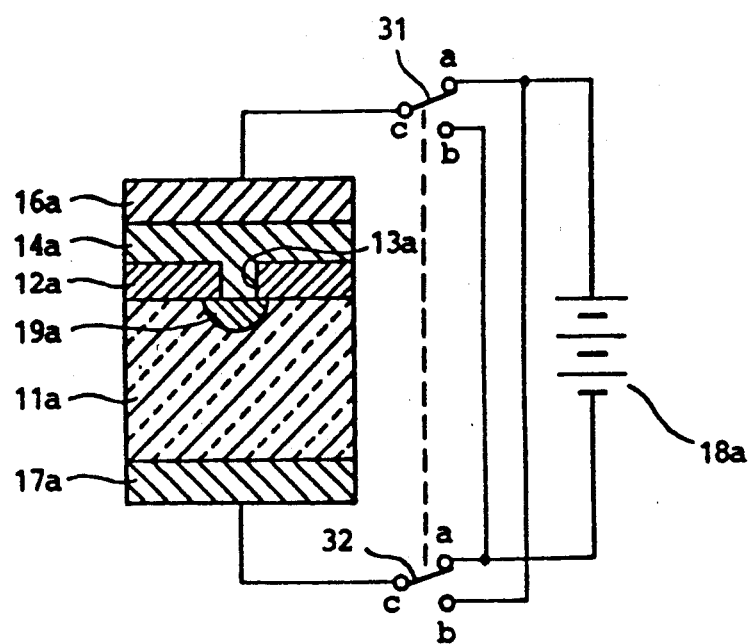

Referring to FIGS. 1(A) and (B), description will be made as regards a conventional method for a better understanding of this invention. The illustrated method may be called a dry method and is substantially equivalent to that described in the article referred to in the background section of the instant specification. Such a dry method includes a voltage impressing step of impressing a d.c. voltage on a waveguide block which is previously manufactured. Accordingly, the voltage impressing step alone will mainly be described in the following. In FIG. 1(A), the waveguide block comprises a glass substrate 11 having primary and secondary surfaces directed upwards and downwards in FIG. 1, respectively, a diffusion--suppressing layer 12 which is deposited on the primary surface and which is partially and selectively etched to form a window or slit 13, and an overlying layer 14 which is deposited on the diffusion-suppressing layer 12 and the primary surface. The glass substrate 11 includes sodium (Na) as a primary ionizable substance. The overlying layer 14 may contain an ionizable substance, such as silver (Ag) which is ionized into a silver ion Ag+ and which may be called a primary ionizable substance. On the overlying layer 14 and the secondary surface of the glass substrate 11, first and second electrodes 16 and 17 are deposited by evaporation, respectively. The illustrated waveguide block is now complete. A d.c. power source 18 is connected between the first and the second electrodes 16 and 17 to impress an electric field within the waveguide block and to diffuse the silver ion from the overlying layer 14 into the glass substrate 11 through the window 13. As a result, a diffused area 19 of Ag+ is formed in the glass substrate 11, as illustrated in FIG. 1(A). After the diffusion of the Ag ion, the diffusion-suppressing layer 12 is removed from the glass substrate 11 together with the overlying layer 13 and the first electrode 16.

Subsequently, a sodium fluoride layer 21 is deposited by evaporation on the primary surface of the glass substrate 11, as illustrated in FIG. 1(B) and contains sodium (Na) which provides a refractive index lower than that of silver. Such evaporation of the sodium fluoride layer 21 is carried out by the use of an evaporation source including sodium. In addition, an additional electrode depicted at 16' is formed on the sodium fluoride layer 21. In this situation, the d.c. power source 18 is again connected between the additional and the second electrodes 16' and 17, like in FIG. 1(A), to diffuse the sodium into the glass substrate 11. Thus, the sodium fluoride layer 21 is operable as an alkali ion diffusion source and may therefore be referred to as an alkali ion layer.

With this method, the diffused area 19 of Ag+ is surrounded by a sodium area which provides the refractive index lower than the silver area 19. At any rate, a difference of the refractive indices is present between the diffused area 19 of silver and the sodium area and serves to prevent leakage of an optical ray transmitted through the diffused area 19 of Ag+.

Now, it is preferable that the alkali ion layer, such as the sodium fluoride layer 21, has a controllable or desirable composition to prevent leakage of the light wave. However, it is practically difficult to adjust the composition of the alkali ion layer to the desirable composition as long as evaporation is used to deposit the alkali ion layer. This is because the composition of an evaporated layer, such as the alkali ion layer, is not stoichiometrically coincident with that of the evaporation source. As a result, a conventional thought is that desirable optical characteristics can not be accomplished by the dry method, as pointed out in the background section of the instant specification.

Referring to FIGS. 2(A), (B), (C), and (D), description will be made as regards a method according to a preferred embodiment of this invention. As shown in FIG. 2(A), a substrate 11a is first prepared and may be formed by phosphate glass comprising, by mol percentages, 76% of phosphorus pentaoxide ($P_2O_5$), 5% of aluminum oxide ($Al_2O_3$), and 3% of sodium oxide ($Na_2O$). In this connection, a step of preparing the substrate 11a may be called a first step. The illustrated substrate 11a may have a size of 30×5×3 (mm) and primary and secondary surfaces directed upwards and downwards in FIG. 2(A). As will become clear later, the sodium oxide contains sodium as a primary ionizable substance which is ionized into an alkali ion, namely, Na+ and which has a predetermined refractive index.

On the primary surface of the substrate 11a, a first layer 12a of titanium (Ti) is deposited to a thickness of several micron meters by the use of evaporation or sputtering, as illustrated in FIG. 2(A), and serves as a diffusion-suppressing or diffusion-blocking layer. Such deposition of a diffusion-suppressing layer may be referred to as a second step.

As illustrated in FIG. 2(B), the first layer 12a is selectively etched or removed along a predetermined optical passage pattern from a front side in FIG. 2(B) to a rear side thereof by a photolithography technique known in the art after deposition of the first layer 12a. The removal or etching step may be referred to as a third step. During the third step, a slit or window 13a is formed in the first layer 12a. As a result, the primary surface of the substrate 11a is partially exposed to the atmosphere to provide an exposed area. In the example being illustrated, the slit 13a is about 10 micron meters wide.

As shown in FIG. 2(C), a second or overlying layer 14a of silver (Ag) is deposited on the exposed area of the primary surface and the first layer by evaporating or sputtering during a subsequent fourth step. Thus, the second or overlying layer 14a contains, as a secondary ionizable substance, Ag which provides a refractive index greater than the primary ionizable substance, such as sodium (Na).

In FIG. 2(D), first and second electrodes 16a and 17a are deposited on the second layer 14a and the secondary surface of the substrate 11a after the deposition of the second layer 14a to provide a waveguide block. Each of the first and the second electrodes 16a and 17a may be formed, for example, by aluminum Thereafter, the waveguide block is heated to a temperature of 400° C. by a heater, such as an electric furnace, and is kept at this temperature.

A d.c. voltage of, for example, 6 volts is supplied from a power source 18a in a manner to be described in detail to form an optical passage region 19a within the substrate 11a, as shown in FIG. 2(D). Such a step of supplying the d.c. voltage may be called a fifth step. More specifically, a switch circuit is connected to the waveguide block, as illustrated in FIG. 2(D), and is operable to switch the d.c. voltage from a selected one of positive and negative polarities of the d.c. voltage to the other polarity.

In the illustrated example, the switch circuit comprises first and second units 31 and 32 which have common terminals c connected to the first and the second electrodes 16a and 17a, respectively, and which are simultaneously switched. In addition, each of the first and the second switch units 31 and 32 has first and second contacts depicted at a and b. The first contact a of the first switch unit 31 is connected to both the second contact b of the second switch unit 32 and a positive terminal of a d.c. power source 18a while the first contact a of the second switch unit 32 is connected to both the second contact b of the first switch unit 31 and a negative terminal of the d.c power source 18a.

At first, the common terminals c of the first and the second switch units 31 and 32 are connected to the first contacts a of the first and the second switch units 31 and 32, respectively, as illustrated in FIG. 2(D). Under the circumstances, the first and the second electrodes 16a and 17a are connected to the positive and the negative terminals of the d.c. power source 18a. As a result, the d.c. power source 18a supplies plus and minus voltages to the first and the second electrodes 16a and 17a for three hours, respectively. In other words, the positive polarity of the d.c. voltage is applied to the first and the second electrodes 16a and 17a when the common terminals c of the first and the second switch units 31 and 32 are connected to the first contacts a, as shown in FIG. 2(D). Therefore, the secondary ionizable species, namely, silver is ionized into Ag ions and is diffused through the slit 13a into the substrate 11a to form a diffused region 19a of silver. From this fact, it is readily understood that the first layer 12a serves as a mask for masking Ag ions. In the example illustrated, the diffused region 19a is several tens of micron meters deep.

Figure 3A:
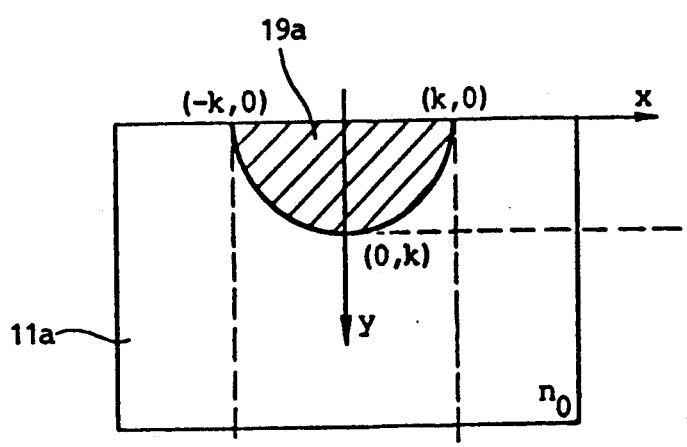
FIGS. 3(A), (B)), and (C) show a step illustrated in FIG. 2(C) in detail.

Referring to FIGS. 3(A), (B), and (C), the diffused region 19a of silver has a semicircular outline having a radius of k, as shown in FIG. 3(A), when the Ag ions are diffused in the above-mentioned manner. The diffused region 19a is buried into the substrate 11a having a primary refractive index $n_0$. Herein, an x axis and a y axis are taken along the width direction in FIG. 2(D) and the depth direction, respectively, as readily understood from FIGS. 2(D) and 3(A). In this connection, the semicircular configuration of the diffused region 19a is specified by positive and negative points (k, 0) and (−k, 0) placed on the x axis and by an apex point represented by (0, k) placed on the y axis, as illustrated in FIG. 3(A).

Figure 3B:
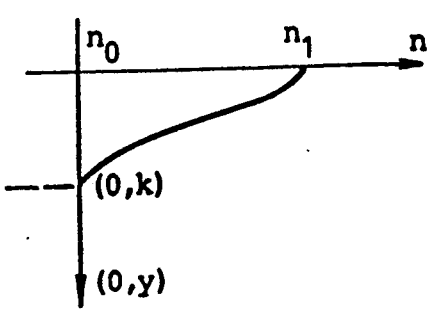

In FIG. 3(B), the reference index $n_1$ of the diffused region 19a is taken along an abscissa and has a distribution which decreases as the diffused region 19a becomes deeper along the y axis.

Figure 3C:
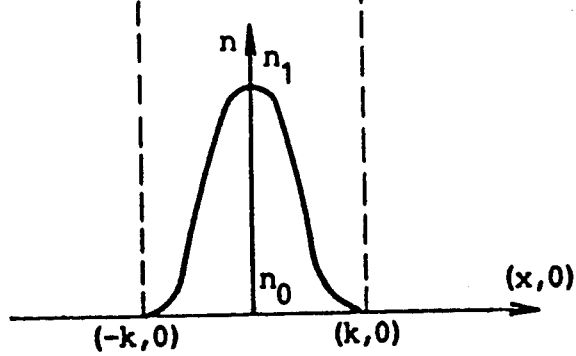

On the other hand, the distribution of the refractive index $n_1$ is illustrated along the x axis in FIG. 3(C). As illustrated in FIG. 3(C), the diffused region 19a has a distribution of the refractive index which exhibits a maximum refractive index on the y axis and which decreases as the distance from the y axis increases.

Referring back to FIG. 2(D), the first and the second switch units 31 and 32 are switched from the first contacts a to the second contacts b after the diffused region 19a of silver is formed within the substrate 11a. In this case, the waveguide block is kept at the temperature of 400° C. Therefore, the first and the second electrodes 16a and 17a are supplied with the minus and the plus voltages from the d.c. power source 18a, respectively. In other words, the negative polarity of the d.c. voltage is impressed on the waveguide block. The negative polarity of the d.c. voltage is supplied to the waveguide block for nine hours.

During supply of the negative polarity of the d.c. voltage, the Ag ions which are diffused and migrated into the substrate 11a are partially released towards the second layer 14a connected to the negative terminal of the d.c. power source 18a.

Figure 4:
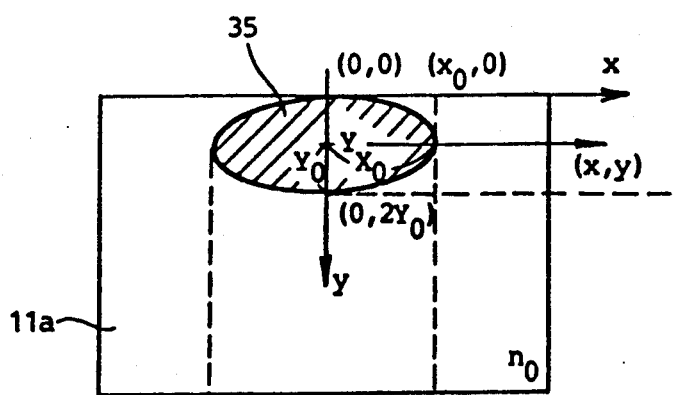
FIGS. 4(A), (B)B, and (C) show another step illustrated in FIG. 2(D) in detail.
Figure 4:
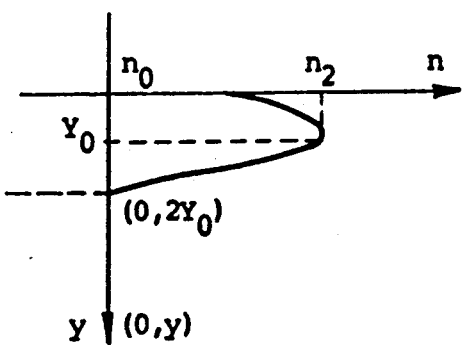
Figure 4:
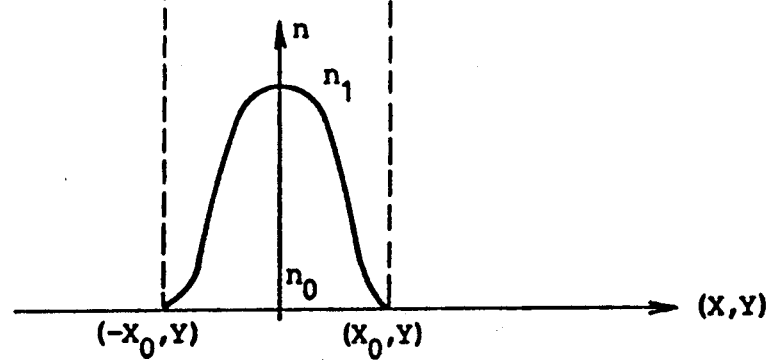

Referring to FIGS. 4(A), (B), and (C), the optical passage 35 is illustrated which is formed in the above-mentioned manner. As shown in FIG. 4(A), the x axis and a y axis are determined as in FIG. 3(A) and the optical passage 35 has an elliptic shape in section. From this fact, the illustrated optical passage 35 has a major axis and a minor axis along the x and the y axes, respectively. This shows that the optical passage 35 is almost completely buried in the substrate 11a by impressing the negative polarity of the d.c. voltage, as mentioned above. More specifically, halves of the optical passage 35 along the major and the minor axes x and y are depicted at X0 and Y0, as shown in FIG. 4(A) and may be practically about 90 and 60 micron meters, respectively. The optical passage 35 has distributions of the refractive index along the y axis and the x axis, respectively, as illustrated in FIGS. 4(B) and (C). Along the y axis, the distribution of the refractive index has a maximum refractive index $n_1$ at a depth Y0, as readily understood from FIG. 4(B). On the other hand, the maximum refractive index $n_1$ is placed at a position of the y axis in the distribution of the refractive index along the x axis, as shown in FIG. 4(C).

When the refractive index of the substrate 11a is represented by $n_0$, a difference between the maximum refractive index $n_1$ and the refractive index $n_0$ of the substrate 11a is practically about 0.015.

According to the above-mentioned embodiment, secondary ions, such as Ag ions, are diffused or migrated into the substrate 11a by supply of the positive polarity of the d.c. voltage and are partially released from the substrate 11a towards the second layer 14a. Thus, the optical waveguide is simply manufactured by this dry method according to this invention.

In other words, it is unnecessary to diffuse alkali ions into the substrate so as to lower the refractive index after diffusion of Ag ions into the substrate. Therefore, this method dispenses with a layer which is deposited as an alkali ion source on the substrate and the composition of which can not be controlled, as mentioned in the background section of the instant specification.

While this invention has thus far been described in conjunction with a preferred embodiment thereof, it will readily be possible for those skilled in the art to put this invention into practice in various other ways. For example, the first layer or the diffusion-suppressing layer 12a need not be restricted to a layer of Ti, but may have a heat resistance and an acid resistivity. For example, the first layer 12a may be formed, for example, by chromium Instead of Ag, the second layer 14a may comprise any other ion compounds, such as AgCl, AgBr, CsCl, CsBr, or the like, that serve to increase the refractive index. The substrate 11a may be of silicate glass, borosilicate glass, or the like. In addition, the switch circuit may be an electrical connection which can manually switch the polarities of the d.c. voltage from one to another.

What is claimed is:

1. A method of manufacturing an optical waveguide which guides a light wave through a light transmitting passage, said method comprising:
    a first step of preparing a substrate which has a primary surface and a secondary surface and which contains a primary ionizable substance providing a predetermined refractive index;
    a second step of depositing a diffusion-suppressing layer on said primary surface of the substrate;
    a third step of forming a slit by selectively removing said diffusion-suppressing layer in order to partially expose said primary surface and to thereby define an exposed area of said primary surface;
    a fourth step of depositing an overlying layer on said exposed area and on the diffusion-suppressing layer, said overlying layer containing a secondary ionizable substance which provides a refractive index greater than said predetermined refractive index;
    a fifth step of forming said optical waveguide by supplying a d.c. voltage from a d.c. voltage source on both sides of said overlying layer and said secondary surface;
    said fifth step comprising the steps of:
    preparing a switch circuit to switch said d.c. voltage between a positive polarity and a negative polarity;
    impressing a selected polarity of said positive and said negative polarities of said d.c. voltage between said overlying layer and said secondary surface through said switch circuit to ionize said secondary ionizable substance and diffuse said secondary ions into said substrate through said slit in order to form a diffused region of said secondary ions;
    switching said switching circuit to change said d.c. voltage from said selected polarity of the d.c. voltage to the other polarity of said positive and said negative polarities of said d.c. voltage and to impress said voltage of said other polarity between said overlying layer and said secondary surface; and
    partially releasing said secondary ions from said diffused region towards said overlying layer to shape said light-transmitting passage.

2. An optical waveguide manufactured in accordance with the method claimed in claim 1.

3. A method as claimed in claim 1, wherein said primary ionizable substance is sodium while said secondary ionizable substance is silver.

4. A method as claimed in claim 3, wherein said selected polarity of the d.c. voltage between the overlying layer and the secondary surface is the positive polarity of the d.c. voltage while the other polarity of the d.c. voltage between the overlying layer and the secondary surface is the negative voltage of the d.c. voltage.

* * * * *